United States Patent
Ward (10) Patent No.: US 6,827,545 B2
(45) Date of Patent: Dec. 7, 2004

(54) ANTI-INERTIA STACKER

(76) Inventor: Lawrence A. Ward, 26 Woodstock Cir., Collegeville, PA (US) 19426

( * ) Notice: Subject to any disclaimer, the term of this patent is extended or adjusted under 35 U.S.C. 154(b) by 86 days.

(21) Appl. No.: 10/421,392

(22) Filed: Apr. 23, 2003

(65) Prior Publication Data

US 2003/0194307 A1 Oct. 16, 2003

Related U.S. Application Data

(63) Continuation-in-part of application No. 09/843,457, filed on Apr. 26, 2001, now abandoned.
(60) Provisional application No. 60/200,677, filed on Apr. 28, 2000.

(51) Int. Cl.[7] .............................................. B65G 57/03
(52) U.S. Cl. ............................... 414/793.4; 414/790.9; 414/794.8
(58) Field of Search ........................... 414/790.9, 791.1, 414/793.4, 793.5, 793.6, 793.7, 794.1, 794.8, 802

(56) References Cited

U.S. PATENT DOCUMENTS

| | | | |
|---|---|---|---|
| 2,323,174 A | 6/1943 | Wikle | |
| 3,685,636 A | 8/1972 | Putin | |
| 3,768,807 A | 10/1973 | Spengler | |
| 5,768,857 A | 6/1998 | Ward et al. | .................... 53/447 |
| 6,341,698 B1 | 1/2002 | Wursthorn | ................... 209/552 |

Primary Examiner—Janice L. Krizek
(74) Attorney, Agent, or Firm—Volpe and Koenig, P.C.

(57) ABSTRACT

An anti-inertia stacker for stacking products and especially suited for products which are prone to dislodgment on or from a substrate during processing movement is provided. The anti-inertia stacker comprises a traveling pallet which is mounted for movement. The traveling pallet receives a product or product laden substrate from a conveyor while traveling at substantially the same speed as the conveyor. The traveling pallet includes a moveable conveying surface. The conveying surface, moving in the direction opposite to the direction of travel of the product or product laden substrate, decelerates the received item. The product or product laden substrate can then be stacked.

13 Claims, 6 Drawing Sheets

ANTI-INERTIA STACKER

CROSS-REFERENCE TO RELATED APPLICATIONS

This application is a continuation-in-part of U.S. application Ser. No. 09/843,457, filed Apr. 26, 2001 now abandoned which claims the benefit of U.S. Provisional Patent Application No. 60/200,677, filed Apr. 28, 2000.

BACKGROUND

Automated food processing machines have become prevalent in the art for creating food "set-ups" for future use, such as sandwich making, and for creating stacks of food products for storage and shipping. Certain foods however, such as cooked bacon, are difficult to stack because they are slippery. Many foods contain an amount of grease necessitating the use of a substrate which is resistant to grease permeation, such as waxed or plasticized paper. When the food on the substrate is decelerated from a conveyor in order to stack it for shipping or additional processing, the foods have a tendency to slide along the substrate surface, causing spillage and uneven stacking.

In one prior known automatic in-line food preparation machine, disclosed in U.S. Pat. No. 5,768,857, of which the present inventor is a co-inventor, slices or pieces of food product are placed on a conveyor system and transferred onto an approved substrate, such as paper or polyethylene, introduced onto the conveyor beneath the food product as the food product travels along the conveyor path. Thereafter, the food product-laden substrate is transferred to a stacker to produce a neat and efficient stack of the food products separated by the substrates. However, for slippery foods, the deceleration required at the stacker causes the food products to move on or even slide off the substrate, requiring the equipment to run at reduced speeds, well below the capacity of the equipment.

In one known application, cooked bacon was layered or stacked on a 9-inch by 14-inch paper substrate. The deceleration for transferring each bacon-laden substrate from the conveyor to the stacker necessitates a reduced conveyor speed so that only approximately 20–22 units per minute of cooked bacon laden substrates can be stacked without causing the bacon to slide off the substrate upon entry to the stacker.

The inherent limitations for the above described systems inhibit the overall efficiency of stacking operations. Currently, there is a need for an efficient and cost-effective stacking mechanism for slippery products, such as cooked bacon, which are placed on substrates and stacked.

SUMMARY

The present invention provides an anti-inertia stacker for stacking products and which is especially useful for stacking products located on a substrate which are prone to dislodgment on or from a substrate during processing movement. The anti-inertia stacker comprises a traveling pallet which is mounted for movement along a defined path, the pallet including a plurality of independently rotatable parallel rollers connected to a support. The rollers are independently driveable in a direction opposite to a direction of travel of the traveling pallet. A drive member is mounted for movement by a control actuator into and out of contact with the traveling pallet in the stacking area. A sensor is located along the path of the traveling pallet for sensing the product or a product laden substrate and signaling a controller which activates the control actuator to move the drive member into engagement with the rollers to drive one or more of the rollers.

In a further improvement of the invention, a stacker sensor is provided which detects a position of a stacked product or product laden substrate and signals stack position data to the controller. The controller compares the stack position data to a preferred stack position and adjusts a timing of the activation of the control actuator so that the timing of the drive member engaging the rollers is advanced or retarded to attain a desired stack position.

Preferably, the rollers include non-intermeshing pinion gears and the drive member comprises a rack which can be brought into and out of engagement with one or more of the pinion gears of the rollers to drive one or more of the rollers Alternatively, the rollers can be acted upon by a moving belt that engages the rollers and is initially moving at the same speed as the traveling pallet. The direction and/or speed of the moving belt is then controlled to provide a gradual or more rapid deceleration and stacking of the products or product laden substrates.

In another aspect, the invention provides an anti-inertia bacon stacker which receives substrates laden with strips of cooked bacon from at least two in-feed lanes. Sensors are located along the at least two in-feed lanes to determine if a product-laden substrate is present, and signal the controller to actuate one or more diverters so that the product laden substrate from all of the in-feed lines is directed to a single stacker feed line. The controller also can adjust the speed and/or stop the in-feed lines to ensure that a single product-laden substrate is fed to the stacker at one time.

In another aspect, the invention provides an anti-inertia stacker having a traveling pallet as described above with two spaced-apart drive members. The drive members are moveable from a first, active position which contacts the traveling pallet to a second, non-active position. Two stacking pallets or receiving areas are provided to accept items to be stacked from the conveying surface to a top of a respective stack.

DETAILED DESCRIPTION OF THE PREFERRED EMBODIMENT(S)

Certain terminology is used in the following description for convenience only and is not limiting. The words "right,"

"left," "lower" and "upper" designate directions in the drawings to which reference is made. The words "inwardly" and "outwardly" refer to directions toward and away from, respectively, the geometric center of the anti-inertia stacker 10 in accordance with the present invention and designated parts thereof. The terminology includes the words noted above as well as derivatives thereof and words of similar import.

Figure 1:
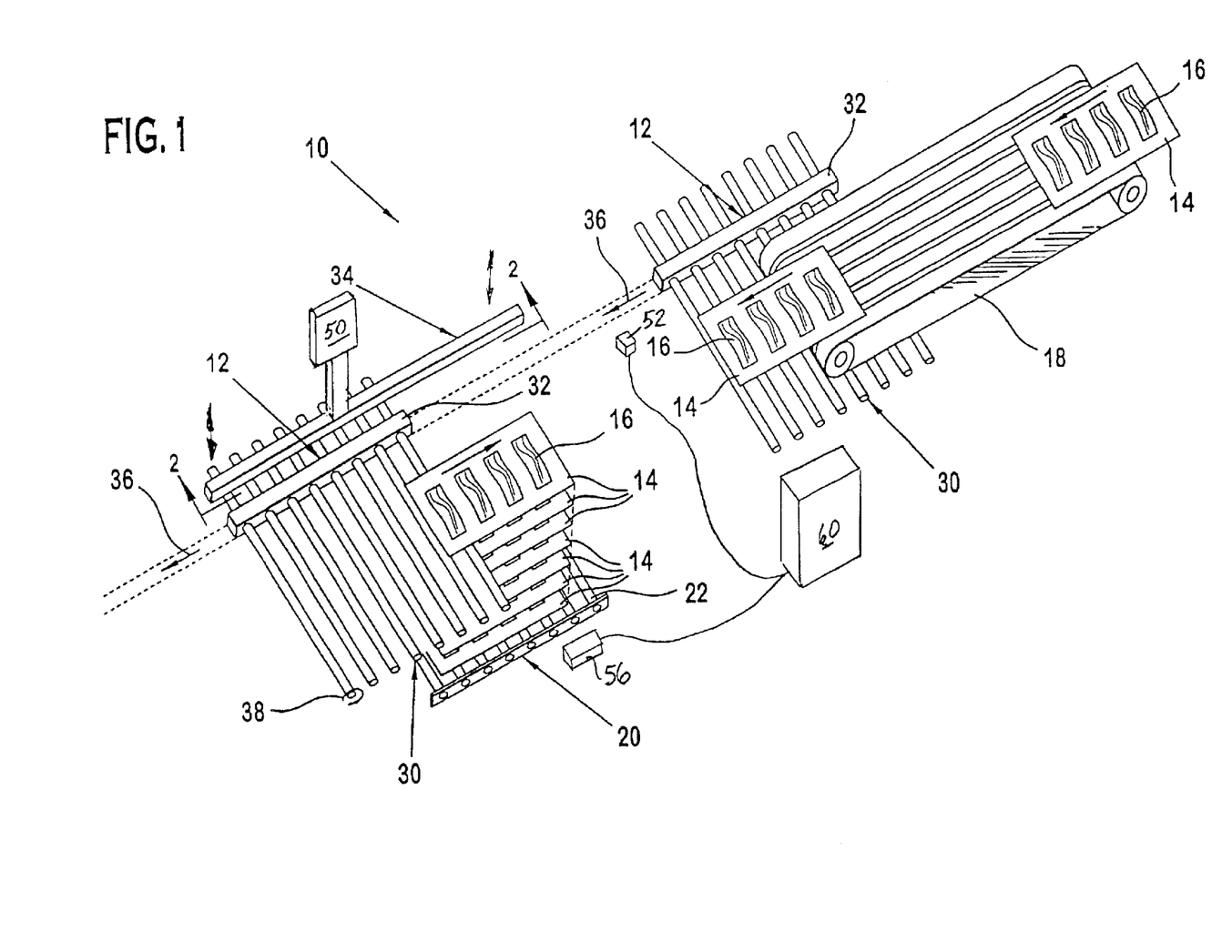
FIG. 1 is a top perspective view of the anti-inertia stacker in accordance with the present application.

Referring to FIG. 1, an anti-inertia stacker 10 in accordance with the present invention is shown. The anti-inertia stacker 10 could be used with automatic in-line food preparation equipment, such as that disclosed in U.S. Pat. No. 5,768,857, which is incorporated herein by reference as if fully set forth. However, it is not necessary to have product on a substrate, and if a substrate is used, it is also not required to fold over the product carrying substrate or paper.

The anti-inertia stacker 10 includes a traveling pallet, platform or support 12 (referred to generally herein as "the traveling pallet 12") which receives a substrate 14 loaded with a product 16, such as cooked bacon, from a conveyor 18. Alternatively, product that does not need any substrate can be delivered to the traveling pallet 12. In one preferred embodiment, the conveyor runs at 150 feet per minute and delivers 40 food product laden substrates 14 per minute to the traveling pallet 12.

Figure 2:
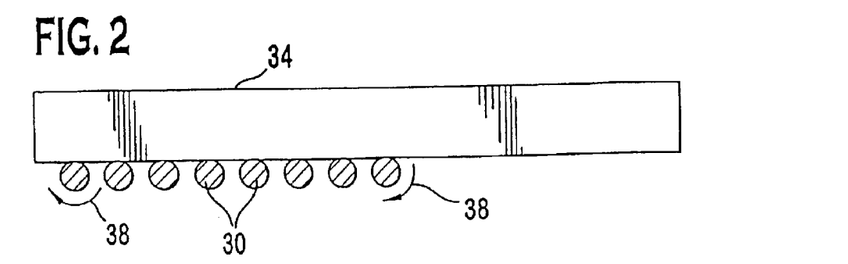
FIG. 2 is a side view of a drive actuator and rollers for a traveling pallet.

As shown in FIGS. 1 and 2, the traveling pallet 12 is mounted for movement in the same direction as the conveyor 18, and may be mounted in a vertical or horizontal carousel arrangement, such that a plurality of traveling pallets 12 can be moved from a product receiving position at the end of the conveyor 18 to an unloading position over a stacking pallet, platform or other suitable support 20 (referred to generally herein as "the stacking pallet 20"). Preferably, the stacking pallet 20 comprises a lowering mechanism which lowers the product as it stacks, such that the first product laden substrate 14 drops only a short distance from the traveling pallet 12 to the stacking pallet 20, prior to the stacking pallet 20 moving downwardly, such that the next product laden substrate 14 can be stacked on top of the previous product laden substrate 14. The lowering mechanism preferably allows accumulation of a pre-set number of products or product-laden substrates onto a stack and discharges the accumulated stack onto a conveyor or table. The lowering mechanism is preferably of the type known in the art, which is mounted for controllable vertical movement downwardly to create a stack of products or product-laden substrates 14 for packaging. The stacking pallet 20 may include rollers 22 that form the pallet surface. The rollers may be connected to a drive motor for rotating rollers forward to unload the stacking pallet 20 when a pre-set quantity of the product laden substrates 14 are stacked thereon. The surface of the pallet 20 could also be formed by a continuous belt or a fixed surface, if desired.

In the first preferred embodiment, the traveling pallet 12, comprises a plurality of rollers 30 which are independently mounted for independent rotary movement in a support 32, preferably in bearings. However, other rotatable mounting arrangements may be utilized, if desired. Positioned along the path of the traveling pallet 12 is an actuating member 34 mounted to an actuator 50 located in proximity to the stacking pallet 20. As each traveling pallet 12 approaches the actuating member 34, a sensor 52 determines when a leading edge of the product or substrate 14 passes a predetermined position. The sensor 52 signals a controller 60, which signals the actuator 50 to actuate at a predetermined time so that the actuating member 34 contacts one or more of the rollers 30, causing the rollers 30 to rotate in a direction opposite to the direction of travel of the pallet 12 at a desired time so that the substrate 14 is unloaded and stacked on a desired target area of the stacking pallet 20. For example, as shown in FIG. 1, the traveling pallet 12 moves from right to left, as indicated by arrows 36, while the rollers 30 are rotated in the clockwise direction as indicated by arrow 38 upon contact with the actuating member 34. By moving the actuating member 34 up and down at a desired time, the rollers 30 may be sequentially contacted or a plurality or even all of the rollers 30 can be contacted at the same time as the traveling pallet 12 continues to move forward. This allows gradual deceleration of a food product laden substrate 14 or other type of product, due to the sequential contact of the rollers 30 rolling against the bottom of the substrate 14, or more rapid deceleration, depending on the number of rollers 30 contacted by the actuating member 34. The product and/or substrate 14 is thereby decelerated to a zero velocity with respect to the stacking pallet 20 and is rolled from the traveling pallet 12 onto the stacking pallet 20 at the desired target area for stacking. This is especially useful for stacking of slippery products, including food products such as cooked bacon, at more than twice the rate previously attainable utilizing the prior known stacking equipment.

In order to ensure that the stack of product laden substrate 14 or products stacked on the stacking pallet 20 are maintained generally aligned in the desired target area, preferably a stacker sensor 56, which may be in the form of a CCD camera or other photosensor, is positioned adjacent to the stacking pallet 20 and detects an edge or other feature of the product and/or substrate 14 and signals the controller 60 with position data Y' which is compared with a desired stack position Y. The controller 60 utilizes this feedback data on the difference ($\delta$Y) in actual stack position to adjust the timing (t) for activating the actuator 50. The timing is adjusted by a applying a factor (k) to $\delta$Y which takes into account the conveyor speed and other variables. This is represented in the flow chart in FIG. 6, which also provides exemplary initialization values so that both positive and negative adjustments can be made so that the timing for engaging the actuating member 34 with the actuator 50 can be advanced or retarded to maintain a desired stack position.

Figure 3:
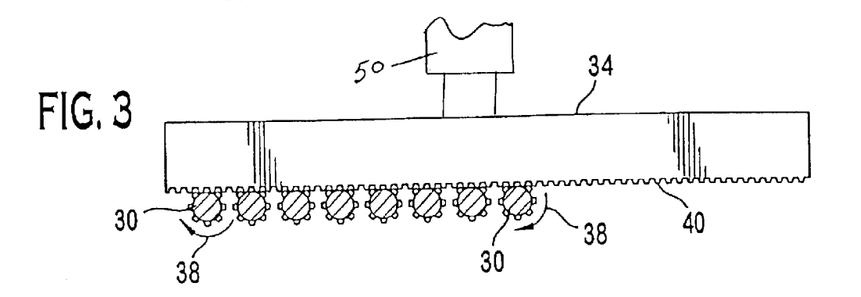
FIG. 3 is a side view of a drive actuator with gear teeth and intermeshing pinion gears located on rollers of a traveling pallet.

Referring now to FIG. 3, a second preferred embodiment of the invention with an alternate arrangement of the actuating member 34 and rollers 30 is shown. In contrast to the arrangement shown in FIG. 2, each roller 30 includes a pinion gear 38, and the actuating member 34 includes gear teeth 40 which engage the pinion gears 38 on the rollers 30 to rotate the rollers 30. This allows for positive engagement and reduced slippage of the rollers 30 when the actuator 50 is activated such that the actuating member 34 moves down to engage the pinion gears 38. Additionally, the pinion gears 38 do not intermesh with one another so that one or more gears 38 can be contacted and driven without all of the gears 38 with their respective rollers 30 being rotated.

Figure 4:
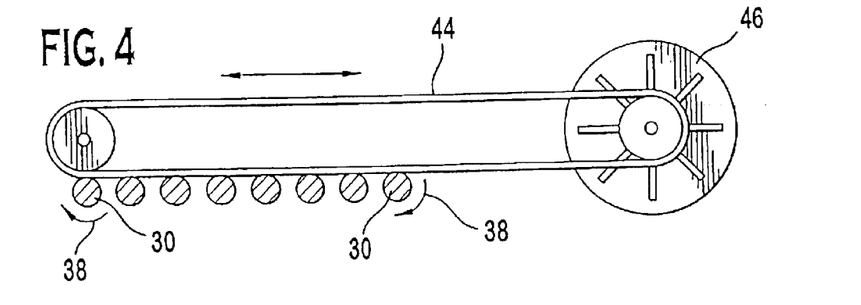
FIG. 4 is a side view of a continuous belt drive actuator with rollers of a traveling pallet.

Referring now to FIG. 4, a third preferred embodiment of the invention is shown in which the actuating member 34 is replaced by a motorized band or belt 44 which contacts the rollers 30. The belt 44 and motor 46 may be mounted on a moveable support that can be moved up and down by the actuator 50. Preferably, the belt or band 44 is driven by the motor 46, and both the speed and direction of rotation of the belt 44 can be controlled, as desired. This allows the speed of rotation of the rollers 30 to be controlled separately from the velocity of the traveling pallets 12 to provide for a faster or slower deceleration of the product laden substrate 14.

In one preferred embodiment, the belt 44 is arranged in a fixed position where it contacts the rollers 30 as they are carried by the traveling pallet 12 to the stacking area. The speed of the belt 44 is controlled by the controller acting on the motor 46 so that it initially matches the speed of the traveling pallet 12 and no relative rotation of the rollers 30 takes place. The speed of the belt 44 is then changed by the controller acting on the motor 46, preferably after all of the rollers 30 are engaged, in order to provide a controlled deceleration, which can be gradual for products that become easily dislodged from a substrate 14. This provides for precise control of the stacking process, and is preferably used in conjunction with the leading edge sensor 52 and/or the stacking sensor 56 to achieve stacking in a desired stack location. This should allow for controlled stacking for high speed feed lines, for example, where the traveling pallet is moving at 240 feet per minute.

Figure 5:
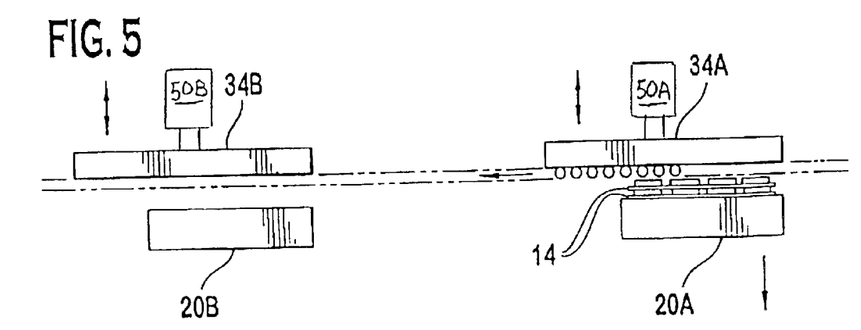
FIG. 5 is a side view of two drive actuators, a traveling pallet and two stacking pallets.

While it is preferred that the traveling pallets 12 be located on a carousel arrangement, it is also possible to use a single traveling pallet 12 which reciprocates between the loading position at the end of the conveyor 18 and the stacking position, as shown in FIG. 1. It is also possible to utilize the traveling pallet 12 in connection with two or more stacking pallets 20A, 20B as shown in FIG. 5, with each stacker having an associated actuating bar 34A, 34B that is activated by a respective actuator 50A, 50B, which are controlled by the controller 60. The actuating bars 34A, 34B are controllably moveable between first and second positions into and out of the path of the rollers 30, and are alternately used so that when a full stack of product is located on stacking pallet 20A, the actuating member 34B is used, and the product laden substrates 14 are stacked on the second stacking pallet 20B. The actuators 50A, 50B used to raise and lower the actuating bars 34A, 34B are of the type generally known in the art, and may be pneumatic actuators or any other suitable arrangement.

It is also possible to provide a traveling pallet 12 having a continuous belt as the supporting surface for the product laden substrate 14. In this case, movement of the continuous belt can be controlled by a motor located on the traveling pallet 12 which acts as the drive alternator. Alternatively, the actuating member 34 could be used in connection with a rack-and-pinion drive or other suitable drive means for rotating the belt in a direction opposite to the direction of travel to or at a slower relative rate than the pallet 12.

Figure 6:
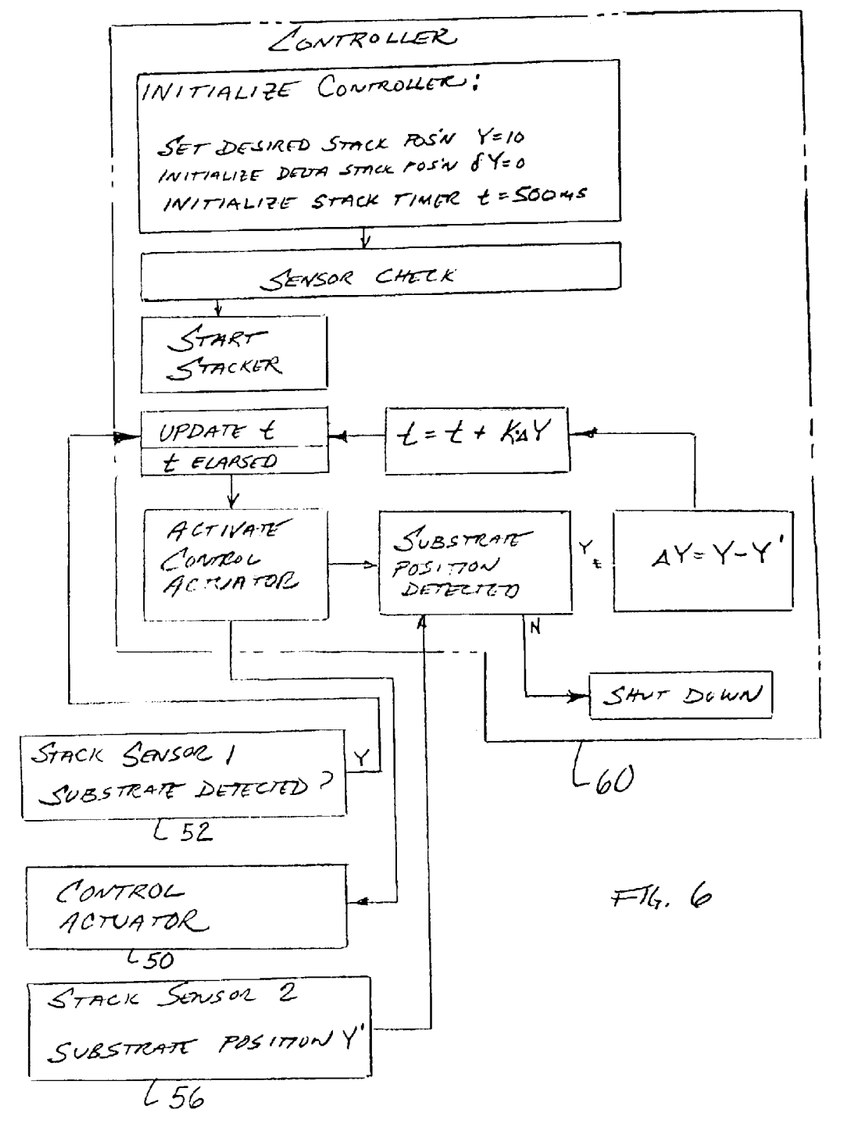
FIG. 6 is a diagram showing the stacking function with feedback adjustment of the stack position.

As shown in FIG. 6, preferably the controller 60 is initialized and the desired stack position Y is set with a value, which is preferably related to a specific desired stack target position on the stacker pallet 20. The delta stack position δY is initialized at zero, and the stack timer for activating the actuator 50 after the sensor 52 detects the substrate 14 is set at a predetermined value, for example 500 ms. Preferably, a sensor check is initiated to ensure that the sensors are clear. The stacker 10 is then started. When the first sensor 52 detects a product laden substrate 14 for stacking, it signals the controller 60, which updates t if necessary based on δY from the previously stacked item. For the first item stacked, the nominal values are used since δY=0. At the required elapsed t, the actuator 50 is activated by the controller 60 so that the actuating member 34 (which can also be belt 44) contacts the rollers 30 to unload the substrate 14 from the traveling pallet 12 onto the stacker pallet 20. The stack sensor 56 then signals the actual stacked substrate position Y' to the controller 60, which calculates δY and then adjusts t for the next substrate 14 to be stacked so that the stack is maintained in the desired stack target position. The stacking process continues with feedback adjustment for the stack position. This allows for adjustments due to changing conditions, such as bacon grease contacting the rollers.

Figure 7:
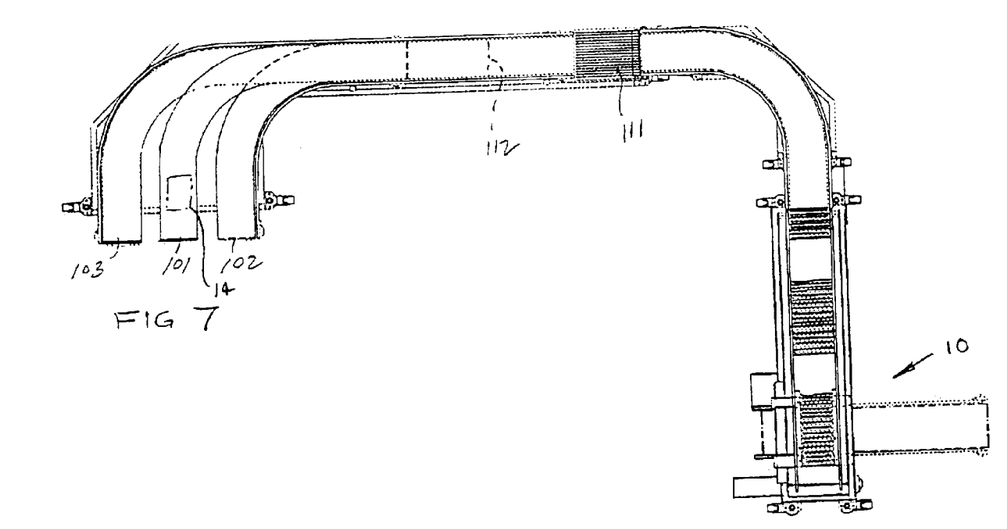
FIG. 7 is a plan view of a multiple in-feed lane stacker in accordance with the present invention.
Figure 8:
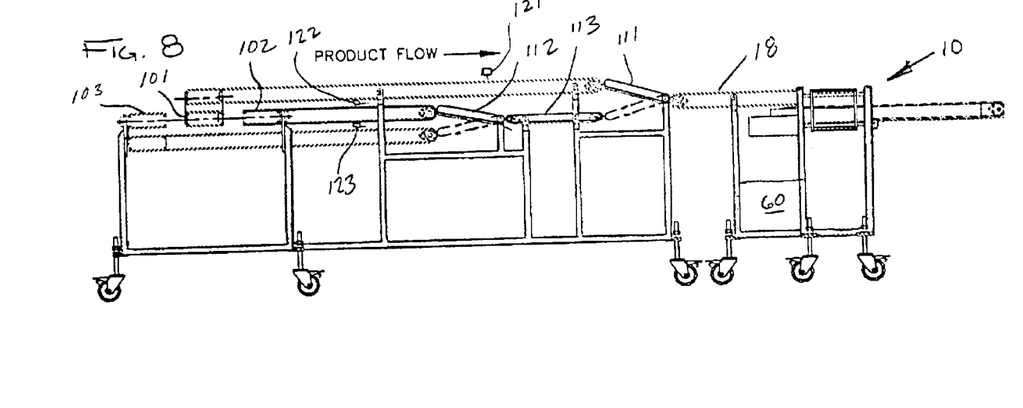
FIG. 8 is an elevational view of the stacker of FIG. 7.

Referring to FIGS. 7–11, multiple in-feed lanes 101, 102, 103 can be fed to the stacker 10. This is especially useful when product flow from a single in-feed lane is sporadic, depending on the processes being carried out on the materials to be stacked, such as strips of cooked bacon. As shown in FIGS. 7 and 8, depending on the floor space available, the in-feed lanes 101, 102, 103, which are preferably conveyors, can turn 90° as they transition from a side-by-side arrangement to a vertically stacked arrangement, with the first in-feed lane 101 transitioning upwardly, the second in-feed lane 102 maintaining approximately the same elevation, and the third in-feed lane 103 transitioning downwardly. A first moveable diverter conveyor 111 is located between the end of the first in-feed lane 101 and the stacker conveyor 18. The diverter 111 is mounted for pivoting movement between a first position in which it receives product laden substrates 14 from the first conveyor 111, and a second position, in which it receives product laden substrates 14 from an intermediate conveyor 113. A second moveable diverter conveyor 112 is located between the end of the second conveyor 102 and the intermediate conveyor 113. The second diverter 112 is mounted for pivoting movement between a first position in which it receives product laden substrates 14 from the second conveyor 102, and a second position in which it receives product laden substrates from the third conveyor 103. Depending upon the positions of the diverters 111, 112, product laden substrates 14 from any of the three in-feed lanes are carried to the stacker conveyor 18.

Figure 11:
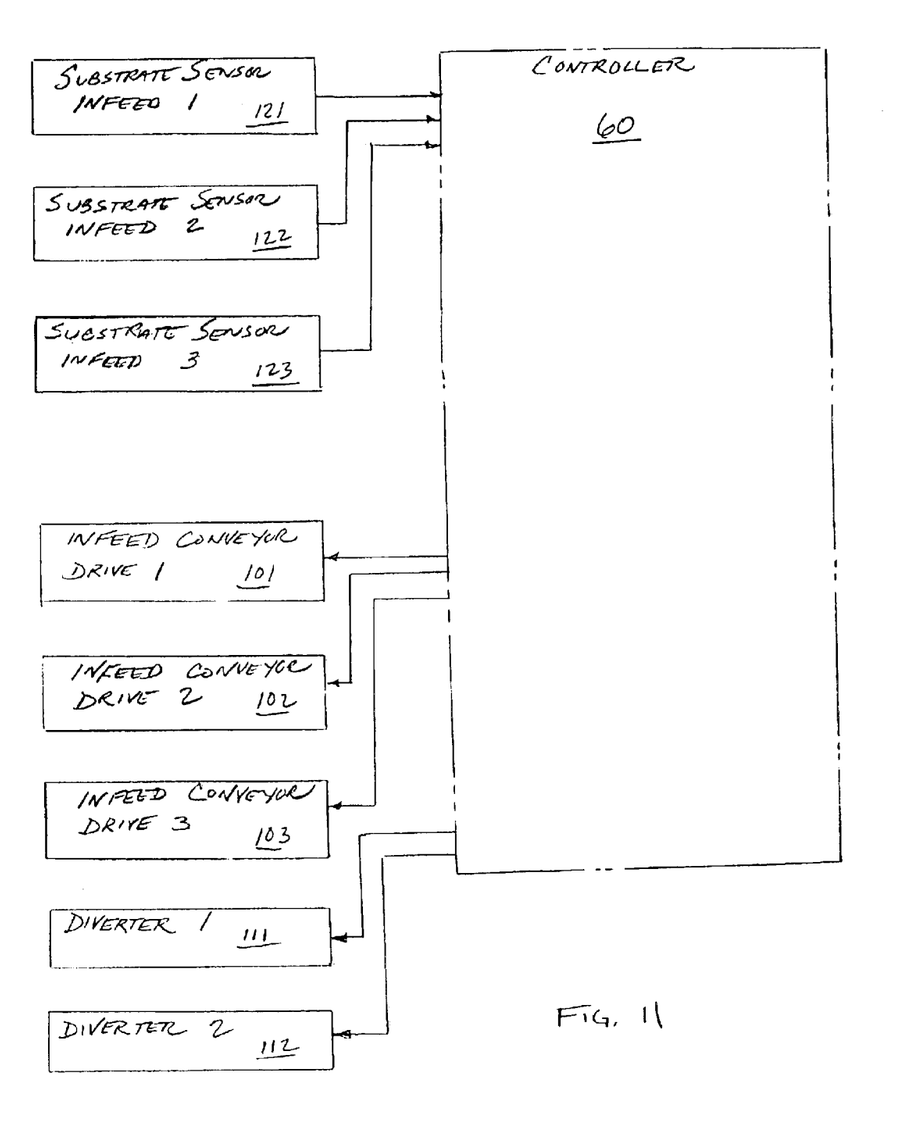
FIG. 11 is a diagram showing how the multiple in-feed lanes are controlled to feed a single stacker feed lane.

Preferably, sensors 121, 122, 123 are located along the each of the in-feed lanes 101, 102, 103, respectively, to detect when a product laden substrate is present. If the first sensor 121 detects a substrate 14, it signals the controller 60, as shown in FIG. 11, which signals the conveyor for the first in-feed lane to continue to drive and deliver the substrate 14 to the first diverter 111, which is in the up position and carries the loaded substrate 14 to the stacker conveyor 18. If one of the second or third sensors 122, 123 detects a substrate 14 during the time required for the substrate on the first in-feed lane 101 to be delivered, it signals the controller 60, which can either signal the respective second or third conveyor drive for the second or third in-feed lanes 102, 103 to reduce speed or stop for a period of time until the substrate on the first conveyor 101 has been delivered to the stacker conveyor 18.

If a substrate 14 is detected by the sensor 112 for the second in-feed lane 102, it signals the controller 60, which signals the first diverter 111 to move to the down position, and signals the second diverter 112 to move to the up position. The controller 60 signals the intermediate conveyor 113 to drive so that the substrate 14 from the second in-feed lane 102 is carried by the second diverter 112 to the intermediate conveyor 113, to the first diverter 111, and then to the stacker conveyor 18. If the first and third sensor 121, 123 detect a substrate 14 on the respective first or third in-feed lanes 101, 103, a signal is sent to the controller 60, which can either signal the respective first or third conveyor drive for the first or third in-feed lanes 101, 103 to reduce speed or stop for a period of time until the substrate on the second conveyor has been delivered to the stacker conveyor 18.

Product laden substrates 14 detected by the sensor 123 for the third in-feed lane 103 are transported to the stacker conveyor 18 in a similar manner, with the controller 60 signaling both the first and second diverters 111, 112 to move to the down position, and signaling the intermediate conveyor 113 to drive.

Those skilled in the art will recognize that various drive mechanisms can be used for the conveyors which form the in-feed lanes 101, 102, 103; and that the diverters 111, 112 also preferably include a driven conveying surface. This type of arrangement allows multiple feed lanes 101, 102, 103 to feed into a single stacker 10 in accordance with the invention, which is more efficient and less costly than having multiple stackers.

Figure 9:
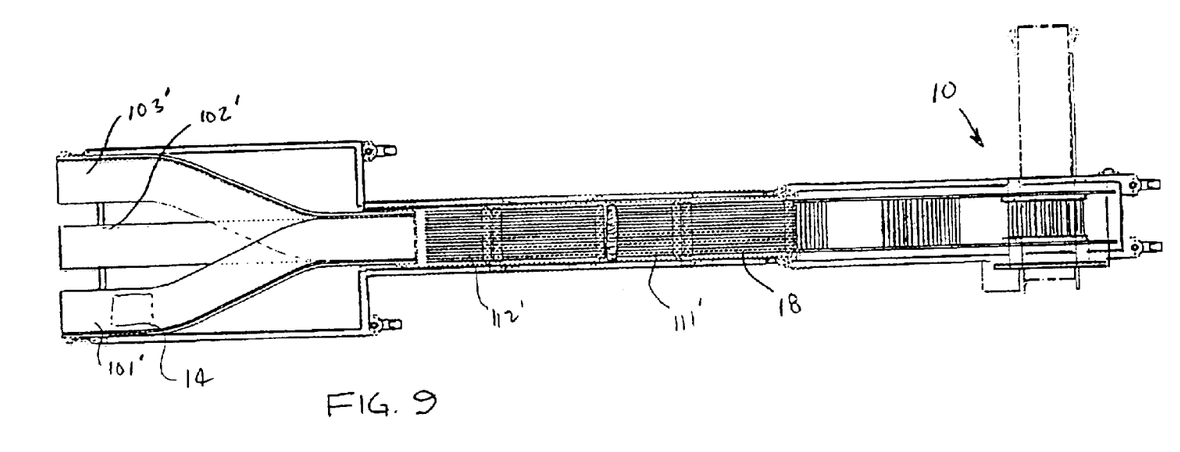
FIG. 9 is a plan view of another embodiment of a multiple in-feed lane stacker in accordance with the present invention.
Figure 10:
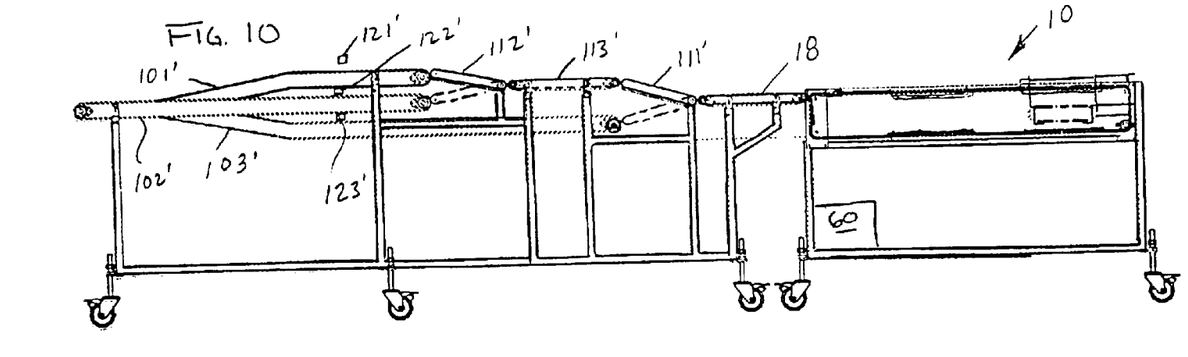
FIG. 10 is an elevational view of the stacker of FIG. 9.

Referring now to FIGS. 9 and 10, depending on the floor space available, the multiple in-feed lanes 101', 102', 103' can be arranged generally linearly to feed product laden substrates 14 to the stacker 10. The sensors 121', 122', 123' are arranged in the same manner as in the embodiment shown in FIGS. 7 and 8, and signal the controller 60, which signals the diverters 111', 112' to move to the required position and the intermediate conveyor 113" to be driven as necessary so that product laden substrates 14 are delivered to the stacker feed conveyor 18. The controller 60 also stops and starts the drives for conveyors of the in-feed lanes 101', 102', 103' in order to deliver only one product laden substrate 14 at a time to the stacker in-feed conveyor 18.

The present invention may be embodied in other specific forms without departing from the spirit or central attributes thereof and, accordingly, the present invention is not limited to the specific embodiments disclosed, but is intended to refer to any stacker providing for controllable, active deceleration of a product or product laden substrate prior to stacking in a desired location.

What is claimed is:

1. An anti-inertia stacker for stacking a product, comprising:
    a traveling pallet mounted for movement along a defined path, the pallet including a plurality of independently rotatable parallel rollers connected to a support, the rollers being independently driveable in a direction opposite to a direction of travel of the traveling pallet;
    a drive member connected to a control actuator for movement into and out of contact with the traveling pallet in a stacking area;
    a sensor located along the path of the traveling pallet for sensing the product or a substrate carrying the product; and
    a controller which receives signals from the sensor and activates the control actuator to move the drive member into engagement with the rollers to drive one or more of the rollers.

2. The anti-inertia stacker of claim 1, further comprising a stacker sensor which detects a position of a stacked product and signals stack position data to the controller, the controller compares the stack position data to a preferred stack position and adjusts a timing of the activation of the control actuator so that a timing of the drive member engaging the rollers is advanced or retarded to attain a desired stack position.

3. The anti-inertia stacker of claim 1, wherein the rollers include non-intermeshing pinion gears and the drive member comprises a rack which is moved into and out of engagement with one or more of the pinion gears of the rollers to drive one or more of the rollers.

4. The anti-inertia stacker of claim 1, wherein the drive member comprises an endless drive belt supported for movement into and out of contact with the rollers.

5. The anti-inertia stacker of claim 1, further comprising a second drive member spaced apart from the drive member and connected to a second control actuator for movement into and out of contact with the traveling pallet in a second stacking area.

6. An anti-inertia stacker which receives substrates laden with product, comprising
    at least first and second in-feed lanes that are directed toward a stacker in-feed conveyor;
    a diverter mounted between the at least first and second in-feed lanes and the stacker in-feed conveyor, the diverter being controllably moveable from a first position in which it extends between the first in-feed lane and the stacker in-feed conveyor and a second position in which it extends between the second in-feed lane and the stacker in-feed conveyor;
    a feed sensor located along each of the at least first and second in-feed lanes to determine if a substrate laden with the product is present;
    a controller which receives signals from the feed sensors and actuates the diverter so that the substrates from the at least first and second in-feed lines are directed to the stacker in-feed conveyor, the controller being adapted to adjust a speed and/or stop the in-feed lines to ensure that a single substrate is fed to the stacker in-feed conveyor at one time;
    a traveling pallet mounted for movement along a defined path, the pallet including a plurality of independently rotatable parallel rollers connected to a support, the rollers being independently driveable in a direction opposite to a direction of travel of the traveling pallet;
    a drive member connected to a control actuator for movement into and out of contact with the traveling pallet in a stacking area;
    a substrate sensor located along the path of the traveling pallet for sensing the product laden substrate; and
    the controller receives signals from the substrate sensor and activates the control actuator to move the drive member into engagement with the rollers to drive one or more of the rollers to stack the substrate.

7. The anti-inertia stacker of claim 6, wherein the product is strips of cooked bacon.

8. The anti-inertia stacker of claim 6, wherein the at least first and second in-feed lanes comprise conveyors located at different elevations, and the diverter comprises a tiltable conveyor.

9. The anti-inertia stacker of claim 6, wherein the rollers include include non-intermeshing pinion gears and the drive member comprises a rack which is moved into and out of engagement with one or more of the pinion gears of the rollers to drive one or more of the rollers.

10. The anti-inertia stacker of claim 6, further comprising a stacker sensor which detects a position of a stacked product laden substrate and signals stack position data to the controller, the controller compares the stack position data to a preferred stack position and adjusts a timing of the activation of the control actuator so that a timing of the drive member engaging the rollers is advanced or retarded to attain a desired stack position.

11. A method for stacking products, comprising:
    loading a product or a product located on a substrate onto a traveling pallet mounted for movement along a defined path, the pallet including a plurality of independently rotatable parallel rollers connected to a support, the rollers being independently driveable in a direction opposite to a direction of travel of the traveling pallet;
    sensing the product or the substrate at a predetermined position along the path and signaling a controller;
    the controller signaling an actuator to move a drive member into contact with the rollers; and rotating the rollers in an opposite direction to the direction of travel of the traveling pallet to decelerate and unload the product or the product laden substrate to a stack location.

12. The method of claim 11, further comprising:

sensing a stacked position of the product or the product laden substrate at the stack location and signaling the controller with stack position data;

the controller comparing the stack position data to a desired stack position;

sensing the next substrate to be stacked traveling along the defined path;

the controller advancing or retarding activation of the drive member moving into contact with the rollers to correct the stacking position.

13. An anti-inertia stacker for stacking products, comprising:

a traveling pallet mounted for movement along a defined path, the pallet including a plurality of independently rotatable parallel rollers connected to a support, the rollers being independently driveable in a direction opposite to a direction of travel of the traveling pallet;

a moving belt connected to a drive motor for controlling at least one of a speed and direction of travel of the belt, the belt being arranged to drivingly contact the rollers in a stacking area;

a product sensor located along the path of the traveling pallet for sensing the product; and a controller which receives signals from the sensor and controls the motor so that the belt is initially driven at a first speed approximately equal to a speed of the traveling pallet as the rollers are engaged so that no rotation takes place, and the controller changes at least one of the speed and direction of the motor so that the rollers are rotated to unload a product located thereon.

* * * * *

UNITED STATES PATENT AND TRADEMARK OFFICE
CERTIFICATE OF CORRECTION

PATENT NO. : 6,827,545 B2
DATED : December 7, 2004
INVENTOR(S) : Lawrence A. Ward It is certified that error appears in the above-identified patent and that said Letters Patent is hereby corrected as shown below:

Column 8,
Line 44, after the first instance of the word "include", delete "include".

Signed and Sealed this

Twenty-second Day of February, 2005

JON W. DUDAS
*Director of the United States Patent and Trademark Office*